United States Patent [19]

Matsuoka et al.

[11] Patent Number: 5,251,080
[45] Date of Patent: Oct. 5, 1993

[54] TAPE LOADING AND BIASING DEVICE FOR RECORDING OR REPRODUCING APPARATUS

[75] Inventors: Hidetoshi Matsuoka; Makoto Fujiki; Junji Kobayashi, all of Tokyo; Hiroo Edakubo, Yokohama, all of Japan

[73] Assignee: Canon Kabushiki Kaisha, Tokyo, Japan

[21] Appl. No.: 931,498

[22] Filed: Aug. 21, 1992

Related U.S. Application Data

[63] Continuation of Ser. No. 499,982, Mar. 27, 1990, abandoned.

[30] Foreign Application Priority Data

Mar. 28, 1989 [JP] Japan .................. 1-73804

[51] Int. Cl.$^5$ ............................ G11B 5/027
[52] U.S. Cl. ............................ 360/85; 360/95
[58] Field of Search ............ 360/85, 95, 96.5

[56] References Cited

U.S. PATENT DOCUMENTS 4,908,723  3/1990  Ohyama ................. 360/95 X
5,103,356  4/1992  Fujiwara ................ 360/95 X

*Primary Examiner*—A. J. Heinz
*Attorney, Agent, or Firm*—Fitzpatrick, Cella, Harper & Scinto

[57] ABSTRACT

A recording or reproducing apparatus which performs loading and unloading operations of a tape relative to a magnetic head unit and moves tape guide members by rotatably driving two loading rings on which the corresponding tape guide members are mounted. Driving force transmission members are provided for transmitting the rotation of one of the rings to the other ring, and elastic members are provided for driving the transmission members in a predetermined direction. The tape guide member mounted on the one ring is pressed against a locating member by the force of the elastic member during loading of the tape.

16 Claims, 3 Drawing Sheets

TAPE LOADING AND BIASING DEVICE FOR RECORDING OR REPRODUCING APPARATUS

This application is a continuation of application Ser. No. 07/499,982 filed Mar. 27, 1990, now abandoned.

BACKGROUND OF THE INVENTION

1. Field of the Invention

This invention relates to a magnetic recording or reproducing apparatus for performing the magnetic recording or reproducing operation of information on, for example, a magnetic tape, and more particularly, to a magnetic recording or reproducing apparatus having a tape loading mechanism for performing a so-called loading operation which loads a magnetic tape on a magnetic head unit and a so-called unloading operation which withdraws the magnetic tape from the magnetic head unit.

2. Description of the Prior Art

There exists a VCR (video cassette recorder) which is provided with a tape loading mechanism for performing a loading operation which draws a magnetic tape out of a magnetic-tape cassette mounted in the VCR and loads the magnetic tape by winding it around a drum along the outer circumference of which magnetic heads rotate. This VCR also performs an unloading operation which takes up the magnetic tape wound around the drum and withdraws the magnetic tape within the cassette. Various methods have been proposed as the tape loading mechanism for the VCR. A method has, for example, been adopted which performs the loading and unloading operations by moving a plurality of magnetictape guide members by rotatably driving two rings, each ring separately supporting a corresponding guide member.

In conventional configurations for the tape loading mechanism of this kind, the magnetic tape guide members moved to loading completion positions by the rotation of the rings during the loading operation are positioned by being pressed against locating members by the energizing force of springs. The springs for this locating operation are mounted on the respective rings. To put it concretely, slide plates are slidably provided on the respective rings, the magnetic tape guide members are mounted on the respective slide plates, and the slide plates are energized by the respective springs mounted on the rings.

FIG. 1 shows a typical tape loading mechanism using such a method, and shows the neighborhood of the above-described rings as a principal part of the mechanism. In FIG. 1, there is shown a main chassis 101 of the apparatus. Rings 106 and 107 as described above are rotatably supported on the chassis 101 by a common support member 108, and are provided one above the other. During the loading and unloading operations, the ring 106 is rotatably driven by a motor (not shown), the rotating driving force of the ring 106 is transmitted to the ring 107 via gears 110 and 111 rotate the ring 107. Springs 121 and 112 for energizing the magnetic tape guide members in order to position the guide members as described before are mounted to the rings 106 and 107, respectively, to energize slide plates (not shown).

In the structure as described above, however, since the slide plates and springs are mounted on the respective rings, space is needed in the direction of the thickness of the device. Especially when the winding angle of the magnetic tape around the drum becomes larger as the size of the VCR becomes smaller, the springs 112 and 121 are necessarily superposed one above another, as shown in FIG. 1. Hence, there is the disadvantage that a further space is needed in the direction of the thickness of the device and this is an obstacle when it is intended to provide a thin apparatus.

Furthermore, if the springs 112 and 121 are separated from each other so that they are not superposed one above another, the springs 121 and 112 rotate in accordance with the rotation of the rings 106 and 107. Hence, there is the disadvantage that a two-dimensionally large space is needed and this is an obstacle when it is intended to provide a small apparatus.

SUMMARY OF THE INVENTION

It is an object of the present invention to solve the problems as described above in this kind of recording or reproducing apparatus in order to provide a thin and small apparatus.

It is another object of the present invention to provide a recording or reproducing apparatus providing a secure tape loading position using a simple configuration in a tape loading mechanism which draws a tape out of a cassette and winds the tape around a rotating head drum.

It is still another object of the present invention to provided a tape loading mechanism which can be made thin with a simple configuration and which has a large degree of freedom in the design of the loading mechanism by performing position regulation using a driving transmission mechanism constituting the tape loading mechanism.

These and other objects are accomplished, according to one aspect of the present invention, by a tape loading apparatus comprising loading means for forming a predetermined tape path by moving the tape guide members along predetermined paths by driving two tape guide driving members on which corresponding tape guide members are mounted, transmission members for transmitting the driving force of one of the tape guide driving members to another tape guide driving member, and energizing means for energizing the transmission members in a predetermined direction and for moving the tape guide members to positions for forming the predetermined tape path when a loading operation has been completed.

It is still another object of the present invention to provide a recording or reproducing apparatus of reduced size because a large space is not needed in the direction of the thickness of the device or in the horizontal direction to house elastic members which move tape guide members during the loading of a tape. The loading operation can be performed using appropriate elastic members because the degree of freedom in the selection of the dimensions of the above-described elastic members becomes large.

According to another aspect, the present invention relates to a recording or reproducing apparatus comprising tape loading means for performing loading and unloading operations of a tape-like recording medium relative to a rotating head drum by moving a pair of loading rings on which corresponding tape guide members are mounted. Transmission members are movably disposed along the direction of rotation of the loading rings and are engaged with the loading rings for transmitting the rotation of one of the rings to another ring. Energizing means are provided for energizing the transmission members in a predetermined direction when loading the tape-like recording medium, and for energizing gizing the loading rings in one direction by elastic force caused by being charged by an overstroke of the loading rings in the loading direction to regulate the positions of the loading rings.

These and other objects and features of the present invention will become more apparent from the following description provided with reference to the accompanying drawings.

DETAILED DESCRIPTION OF THE PREFERRED EMBODIMENT

Figure 1:
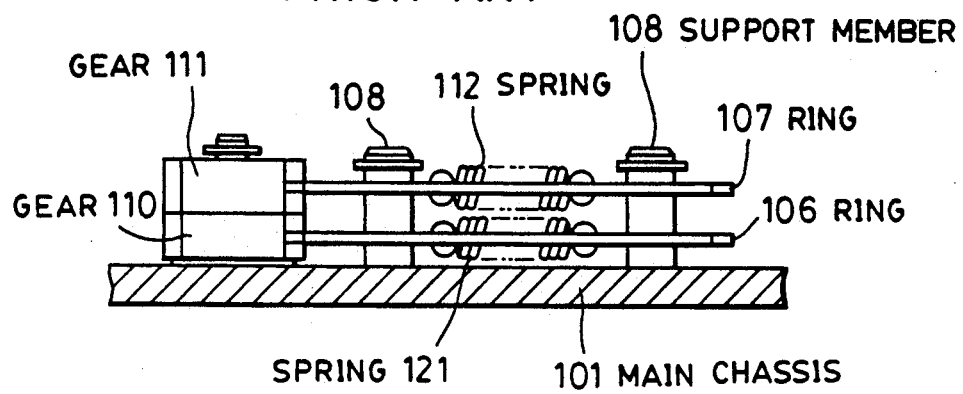
FIG. 1 is a side view showing the rings in a loading mechanism in a conventional VCR.

The present invention will now be explained in detail according to an embodiment shown in the drawings.

Figure 2:
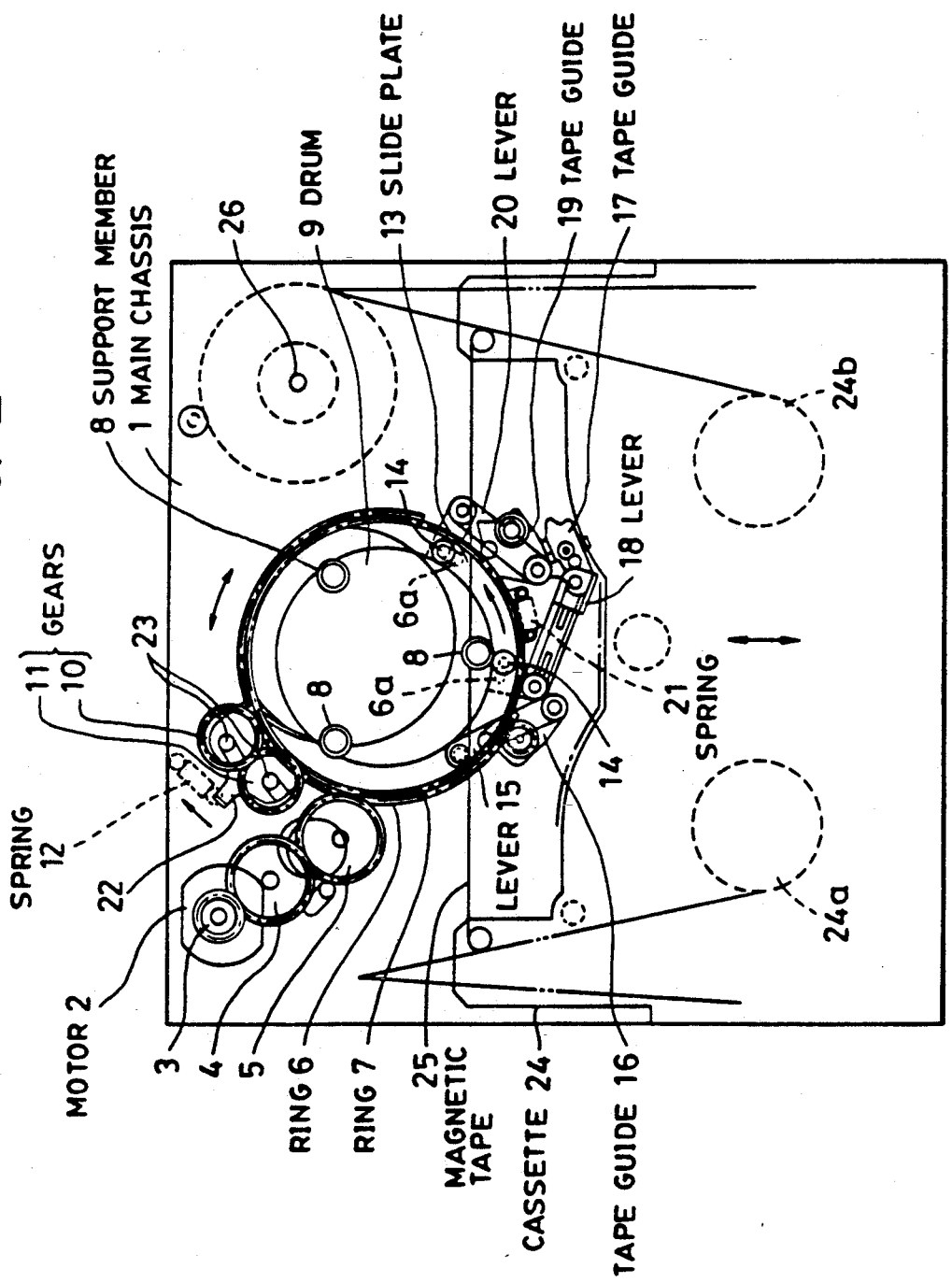
FIG. 2 is a plan view in an unloaded state showing the structure of a tape loading mechanism which adopts the structure according to the present invention in a VCR according to an embodiment of the present invention.
Figure 3:
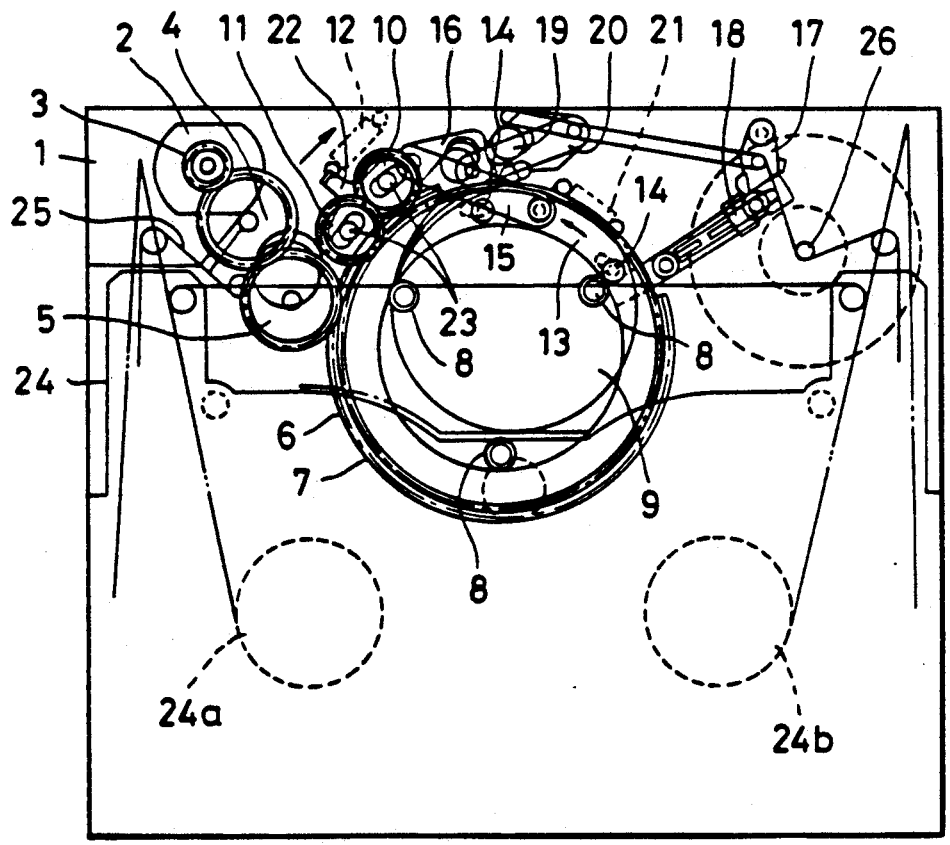
FIG. 3 is a plan view of the FIG. 2 loading mechanism in a loaded state.

FIGS. 2 and 3 are for explaining the structure of a tape loading mechanism in a VCR according to an embodiment of the present invention. FIGS. 2 and 3 show the entire tape loading mechanism in an unloaded state and in a loaded state, respectively. FIG. 1 shows the side of the rings described before as a principal part of a conventional tape loading mechanism.

In FIGS. 2 and 3, there is shown a main chassis 1 of the apparatus. At a portion to the rear of the center of the main chassis 1, a rotating head drum 9 is provided inclined at a predetermined angle. In front of the drum 9 on the main chassis 1, a slide chassis (not shown) for conveying a cassette is provided and is slidable in directions toward and away from the drum 9. On the slide chassis, a magnetic-tape cassette (abbreviated hereinafter a "cassette") 24 housing a magnetic tape 25 wound between two reels 24a and 24b is detachably mounted. The cassette 24 is moved by a slide movement of the slide chassis. That is, the cassette 24 is moved so that the front surface thereof is separated from the drum 9 during unloading, as shown in FIG. 2, and is moved to a position approaching the drum 9 during loading, as shown in FIG. 3. Furthermore, the following members (comprising the tape loading mechanism for performing a loading operation for drawing the magnetic tape 25 out of the cassette 24 and winding the magnetic tape 25 around the drum 9 and an unloading operation for taking up the magnetic tape 25 from the drum 9 and withdrawing the magnetic tape 25) are provided on the main chassis 1.

Figure 4:
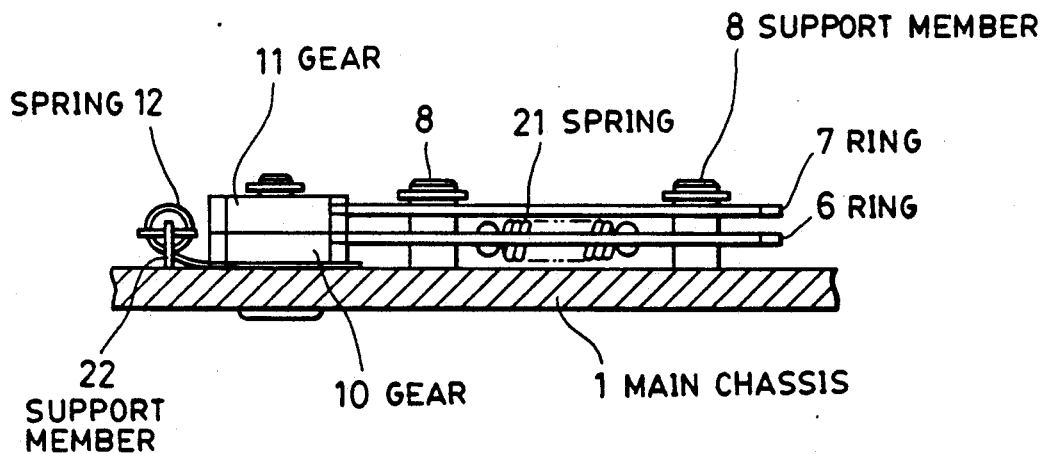
FIG. 4 is a side view showing the rings as a principal part of the loading mechanism shown in FIG. 2.

Rings 6 and 7 move magnetic tape guide members (abbreviated hereinafter "tape guides") as described before. The rings 6 and 7 are formed as gear rings each having gear teeth around its outer circumference. The rings 6 and 7 are disposed so as to surround the drum 9, are rotatably supported by common roller-like support members 8, respectively, and are mounted facing one above another separated by a predetermined space, as shown in FIG. 4.

A slide plate 13 formed in the shape of a circular arc corresponding to the ring 6 is mounted on the lower ring 6. The slide plate 13 is mounted so as to be slidable in the circumferential direction of the ring 6 by slidably fitting pins 14, 14 in long holes 6a, 6a formed in the ring 6. The slide plate 13 is driven in the counterclockwise direction along the circumferential direction of the ring 6 by a spring 21 stretched between the ring 6 and the slide plate 13. Furthermore, projecting pieces projecting outside the ring 6 are formed at two end portions of the slide plate 13, and levers 18 and 20 are rotatably mounted relative to the corresponding projecting pieces. Tape guides 17 and 19 are rotatably mounted on front-end portions of the levers 18 and 20, respectively.

On the other hand, a lever 15 is rotatably mounted on the upper ring 7, and a tape guide 16 is rotatably mounted on the front end of the lever 15.

The tape guides 16, 17 and 19 have respective cylindrical guide posts, which regulate the position of the magnetic tape 25 and form a predetermined tape path.

The moving paths of the tape guides 17, 19 and 16 moved by the rotation of the rings 6 and 7 are regulated so as to form the tape path after passing through predetermined paths via guide rails (not shown) disposed on the main chassis 1.

A motor 2 is a driving source for rotatably driving the rings 6 and 7. A gear 3 is fixed to an output rotating shaft of the motor 2, and meshes with a gear 4. The gear 4 meshes with a gear 5, which meshes with the gear teeth around the outer circumference of the ring 6. The motor's rotating driving force is transmitted to the ring 6 via the gears 3 through 5, and the ring 6 is rotated in the counterclockwise or clockwise direction in FIGS. 2 and 3. In order to transmit the rotating driving force of the ring 6, there are provided gears 10 and 11. The gears 10 and 11 are rotatably pivoted on shafts 23, 23 provided on a support member 22 which is rotatably supported within a predetermined range in the clockwise and counterclockwise directions along the circumferential direction of the rings 6 and 7 making the centers of the rings 6 and 7 the centers of rotation. The support member 22 is driven in the clockwise direction, as shown by an arrow, by a spring 12 stretched between the support member 22 and the main chassis 1.

The gears 10 and 11 mesh with each other, the gear 10 further meshes with the ring 6, and the gear 11 meshes with the ring 7. By such meshing relationship, the rotating driving force of the ring 6 is transmitted to the ring 7 via the gears 10 and 11 as a reverse rotating driving force, and hence the ring 7 is rotated in a direction reverse to that of the ring 6. A capstan 26 is rotated by a motor (not shown) in order to feed the magnetic tape 25.

The operation of the tape loading mechanism having the configuration as described above will now be explained.

As described before, FIG. 2 shows the unloaded state. During the loading operation, the cassette 24 is slid to the position shown in FIG. 3. At the same time the motor 2 is driven, the ring 6 is rotatably driven in the counterclockwise direction via the gears 3 through 5, 10 and 11, and the ring 7 is rotatably driven in the clockwise direction. By the rotation of the rings 6 and 7, the tape guides 17, 19 and 16 move upwardly in FIG. 2 by being guided by guide rails (not shown), drawing the magnetic tape 25 out of the cassette 24, and winding the magnetic tape 25 around the drum 9.

When the tape guides 16, 17 and 19 have moved to the winding completion positions, as shown in FIG. 3, they engage with corresponding locating members (not shown) and are anchored. The rotation of the ring 7 is hindered by the anchorage of the tape guide 16. On the other hand, although the rotation of the slide plate 13 is hindered by the anchorage of the tape guides 17 and 19, the rotation of the ring 6 is not yet hindered at this stage, but the ring 6 rotates in the counterclockwise direction while extending the spring 21 by the rotating driving force of the motor 2 until the tensile force of the spring 21 and the rotating driving force of the motor 2 balance with each other. By the tensile force of the extended spring 21, the slide plate 13 is moved in the counterclockwise direction, and the tape guides 17 and 19 are elastically pressed against the corresponding locating members and are thus positioned.

On the other hand, by a little rotation of the ring 6 in the counterclockwise direction while extending the spring 21 after the rotation of the ring 7 has been hindered, the gear 10 rotates in the clockwise direction relative to the ring 6, and due to this rotation, the gear 11 rotates in the counterclockwise direction. In accordance with the rotation of the rings 10 and 11, the ring 6 rotates in the counterclockwise direction. However, since the rotation of the ring 7 is hindered, the gears 10 and 11 rotate a little in the counterclockwise direction, as shown in FIG. 3, along the circumferential direction of the rings 6 and 7 together with the support member 22. The spring 12 is thereby extended, and the support member 22 is pulled in the clockwise direction by the elastic force of the spring 12. The ring 7 is thereby driven in the clockwise direction via the gear 11, and the tape guide 16 is pressed against the corresponding locating member via the lever and is thus positioned.

After the loading operation has thus been terminated, the magnetic tape 25 is fed by the rotating drive of the capstan 26 and the reel 24b, and the rotating magnetic heads in the rotating head drum 9 slidably contact the magnetic tape 25 while rotating at high speed to perform the recording or reproducing operation. During the unloading operation after the end of the recording or reproducing operation, the motor 2 is rotatably driven in a direction reverse to the loading direction, the ring 6 is rotated in the clockwise direction, and the ring 7 is rotated in the counterclockwise direction. The tape guides 16, 17 and 19 thereby move to their lower positions in FIG. 3, and return to their unloaded positions shown in FIG. 2. In accordance with this operation, the reel 24b is rotatably driven in the clockwise direction and takes up the magnetic tape 25, which is withdrawn from the drum 9 and into the cassette 24.

According to the present embodiment as described above, the spring 21 for moving the tape guides 17 and 19 (which are moved by the rotation of the ring 6 in order to position them during the loading operation) is mounted on the ring 6, while the spring 12 for moving the tape guide 16 (which is moved by the ring 7 in order to position it) is stretched between the support member 22 and the main chassis 1. Hence, as is apparent from FIG. 4, the springs 12 and 21 are provided at positions sufficiently separated from each other, and are therefore not superposed one above another which would increase the thickness of the device. Furthermore, the slide plate which previously has been provided is not provided on the upper ring 7. Accordingly, it is possible to make the entire height of the configuration around the rings 6 and 7 shown in FIG. 4 smaller than in the conventional configuration, and therefore to provide a thin apparatus. Furthermore, since the springs 12 and 21 are not superposed one above another, the required space around the rings 6 and 7 is small, and it is thereby possible to provide a small apparatus.

Moreover, since the springs 12 and 21 are not superposed one above another, the size of each of the springs 12 and 21 can become larger, and it is thereby possible to set the spring force of each spring to the most suitable value. It is thus possible to drive the tape guides with sufficient spring force in order to position them securely, and to securely, and reliably perform the loading operation.

As is apparent from the above-described explanation, according to the present invention, a magnetic recording or reproducing apparatus which perform loading and unloading of a magnetic tape relative to a magnetic head unit by moving a plurality of magnetic tape guide members by rotatably driving two rings on which the corresponding guide members are separately mounted adopts a structure in which driving force transmission members transmit the rotating driving force of one of the two rings to the other ring. Elastic members are also provided for driving the transmission members in a predetermined direction, and the magnetic tape guide member mounted on the one ring is pressed against a locating member by the driving force of the elastic member during loading of the magnetic tape. Hence, the present invention has the excellent effects that it is possible to provide a thin and small apparatus because a large space is not needed in the direction of the thickness as well as in the horizontal direction of the apparatus relative to the arrangement of the elastic members for driving and positioning the tape guide members during loading of the magnetic tape. Further, the loading operation can be securely and reliably performed using appropriate elastic members because the degree of freedom in the selection of the dimensions of the above-described elastic members is large.

The individual components shown in outline of designaged by blocks in the drawings are all well known in the recorder/reproducer arts and their specific construction and operation is not critical to the operation or best mode for carrying out the invention.

While the present invention has been described with respect to what is presently considered the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A tape loading apparatus comprising:
   (A) loading means, including two tape guide members respectively mounted on two tape guide driving members, for forming a predetermined tape path by moving said tape guide members along respective predetermined paths by driving said two tape guide driving members;
   (B) means for producing a driving force to move said tape guide members along their respective predetermined paths, and transmission members for directing said driving force, which is provided to only one of said tape guide driving members, to drive the other tape guide driving member;
   (C) a supporting member for supporting said transmission members; and (D) energizing means for resiliently pulling said supporting member in a predetermined direction, and for positioning said tape guide members to positions which form the predetermined tape path in the state where a loading operation has been completed.

2. A tape loading apparatus according to claim 1, wherein said loading means forms the predetermined tape path by helically winding a magnetic tape housed within a cassette around a rotating head drum which is inclined at a predetermined angle with respect to a horizontal plane.

3. A tape loading apparatus according to claim 2, wherein said tape guide driving members comprise two superposed loading rings disposed so as to rotate around said rotating head drum.

4. A tape loading apparatus according to claim 3, wherein said two loading rings have gear portions on their outer circumferences, and wherein said transmission members comprise a plurality of gears engaged with corresponding gear portions formed on the outer circumferences of said two loading rings, and wherein said transmission members rotate said loading rings in directions reverse to each other.

5. A tape loading apparatus according to claim 4, wherein said transmission members are disposed so as to move on a circular arc making the center of rotation of said loading rings the center of the arc, and wherein said transmission members are movable while engaged with the gear portions of said loading rings.

6. A tape loading apparatus according to claim 5, wherein at least one of said loading rings is rotatable by a predetermined amount of movement around the center of rotation of said loading rings after the tape guide members on said loading rings have been located at positions for forming the predetermined tape path in the state of the loading operation, and wherein said supporting member is resiliently pulled by said energizing means using the movement to move said loading rings for locating the tape guide members to predetermined positions.

7. A tape loading apparatus according to claim 6, wherein one of said two loading rings is rotated by the amount of movement, and said one loading ring is driven relative to the other loading ring by the movement of the one loading ring in the state of the loading operation to position the respective tape guide members at their predetermined positions.

8. A tape loading apparatus according to claim 7, further comprising a driving motor coupled to a given one of the loading rings, and wherein the loading ring connected to said driving motor and the loading ring having the movement for causing said energizing means to resiliently pull the supporting member, are different rings.

9. A recording or reproducing apparatus comprising:
(A) A tape loading means, including two tape guide members respectively mounted on two loading rings, for performing loading and unloading operations of a tape-like recording medium relative to a rotating head drum by rotating said loading rings;
(B) transmission members movably disposed along the direction of rotation of said loading rings and engaged with said loading rings and for transmitting the rotation of one of said rings to the other ring;
(C) a supporting member for supporting said transmission members; and
(D) energizing means for resiliently pulling said supporting member in a predetermined direction in the state where the loading operation has been completed and for driving said loading rings in one direction using an elastic force of said energizing means caused by a movement around a center of rotation of said loading rings of at least one of said loading rings in a loading direction to position the tape guide members at predetermined loading positions.

10. A recording or reproducing apparatus according to claim 9, wherein said tape loading means draws a magnetic tape housed within a cassette out of said cassette and helically winds the magnetic tape around the rotating head drum which is inclined by a predetermined angle with respect to a horizontal plane, to form a predetermined tape path.

11. A recording or reproducing apparatus according to claim 10, wherein said two loading rings are superposed and disposed so as to rotate around said rotating head drum.

12. A recording or reproducing apparatus according to claim 11, further comprising gear portions formed on the outer circumferences of said two loading rings, and wherein said transmission members comprise a plurality of gears engaged with corresponding gear portions formed on the outer circumferences of said two loading rings, and wherein said loading rings are rotated in directions reverse to each other.

13. A recording or reproducing apparatus according to claim 12, wherein said transmission members are disposed so as to move on a circular arc making the center of rotation of said loading rings the center of the arc, and are movable engaged with the gear portions of said loading rings.

14. A recording or reproducing apparatus according to claim 13, wherein at least one of said loading rings is rotatable by the movement in a predetermined amount after the tape guide members on said loading rings have been located at positions for forming the predetermined tape path in the state of a loading operation, and wherein said supporting member is resiliently pulled by said energizing means using the further movement to move said loading rings for locating the tape guide members to predetermined positions.

15. A recording or reproducing apparatus according to claim 14, wherein one of said two loading rings is rotated by the movement amount, and said one loading ring is driven relative to the other loading ring by the movement of the one loading ring in the state of loading operation to position the respective tape guide members at their predetermined positions.

16. A recording or reproducing apparatus according to claim 9, wherein said tape loading means includes a motor for rotatably driving said loading rings, and wherein said motor rotates one of the loading rings.

* * * * *

UNITED STATES PATENT AND TRADEMARK OFFICE
CERTIFICATE OF CORRECTION

PATENT NO. : 5,251,080

DATED : October 5, 1993

INVENTOR(S) : Matsuoka, et al.

It is certified that error appears in the above-identified patent and that said Letters Patent is hereby corrected as shown below:

Title page,

At [54] Title, line 2, and col. 1, line 2,

Change "FOR RECORDING" to --FOR A RECORDING--.

Column 1

Line 2, change "RECORDING" to --A RECORDING--.
    Line 34, change "magnetictape" to --magnetic tape--.

Column 3

Line 2, change "gizing gizing" to --gizing--.
    Line 43, change "ter a" to --ter as--.

Column 6

Line 13, change "perform" to --performs--.
    Line 37, change "of" to --or--.

UNITED STATES PATENT AND TRADEMARK OFFICE
CERTIFICATE OF CORRECTION

PATENT NO. : 5,251,080
DATED : October 5, 1993
INVENTOR(S) : Matsuoka, et. al.

It is certified that error appears in the above-indentified patent and that said Letters Patent is hereby corrected as shown below:

Column 8

Line 1, delete "and".

Signed and Sealed this

Seventh Day of June, 1994

Attest:

*Attesting Officer*

BRUCE LEHMAN
*Commissioner of Patents and Trademarks*